July 21, 1925.

M. O. REEVES

SPEED VARYING TRANSMISSION

Filed Aug. 4, 1923  2 Sheets-Sheet 1

1,546,996

INVENTOR
Milton O. Reeves,
BY
Arthur M. Hood.
ATTORNEY

July 21, 1925.
M. O. REEVES
SPEED VARYING TRANSMISSION
Filed Aug. 4, 1923
1,546,996
2 Sheets-Sheet 2
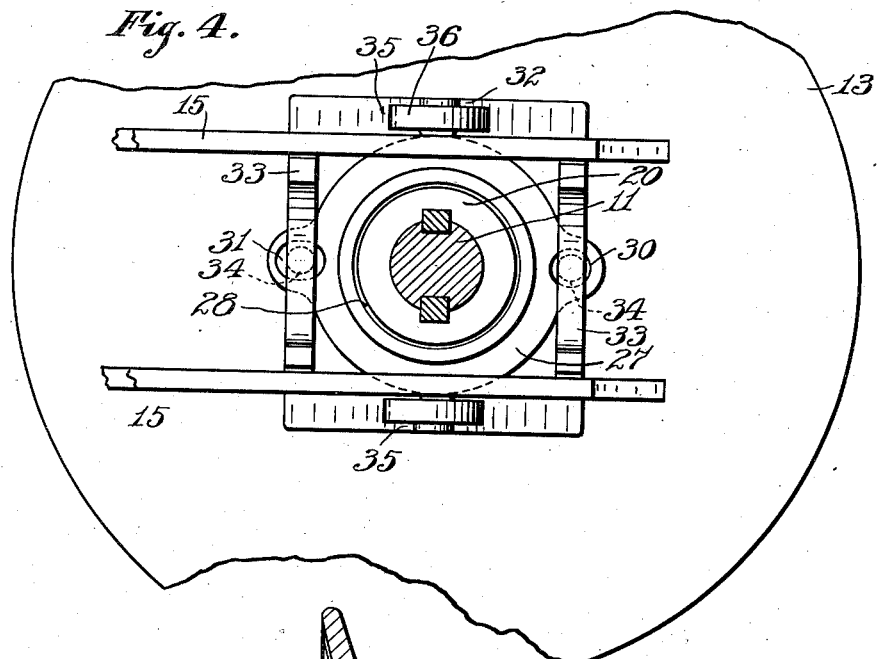
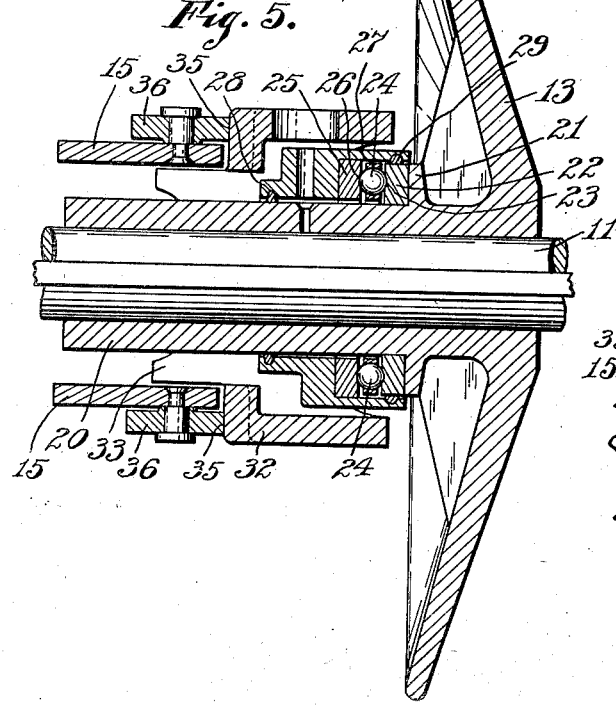
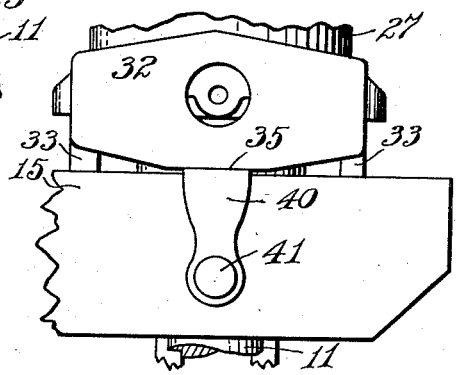
INVENTOR
Milton O. Reeves,
BY
Arthur M. Hood,
ATTORNEY Patented July 21, 1925.

1,546,996

UNITED STATES PATENT OFFICE.

MILTON O. REEVES, OF COLUMBUS, INDIANA; AMANDA M. REEVES, EXECUTRIX OF SAID MILTON O. REEVES, DECEASED, ASSIGNOR TO REEVES PULLEY COMPANY, OF COLUMBUS, INDIANA, A CORPORATION OF INDIANA.

SPEED-VARYING TRANSMISSION.

Application filed August 4, 1923. Serial No. 655,559.

*To all whom it may concern:*

Be it known that I, MILTON O. REEVES, a citizen of the United States, residing at Columbus, in the county of Bartholomew and State of Indiana, have invented a new and useful Speed-Varying Transmission, of which the following is a specification.

In that type of speed-varying transmission in which there are two pairs of co-acting cones supporting a V-shaped belt, the two cones of the two pairs being simultaneously shifted in opposite directions in order to vary the radii of contact between the belt and cone pairs, the cones are shifted by swinging levers acting upon thrust bearings interposed between the levers and cones.

The object of my present invention is to provide improvements in details of construction by means of which the tendency, heretofore existing, for such levers to laterally displace one ring of the thrust bearing relative to the other, will be eliminated.

Figure 1:
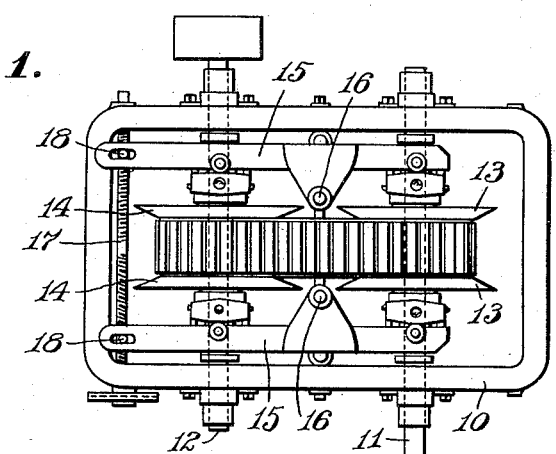
Figure 2:
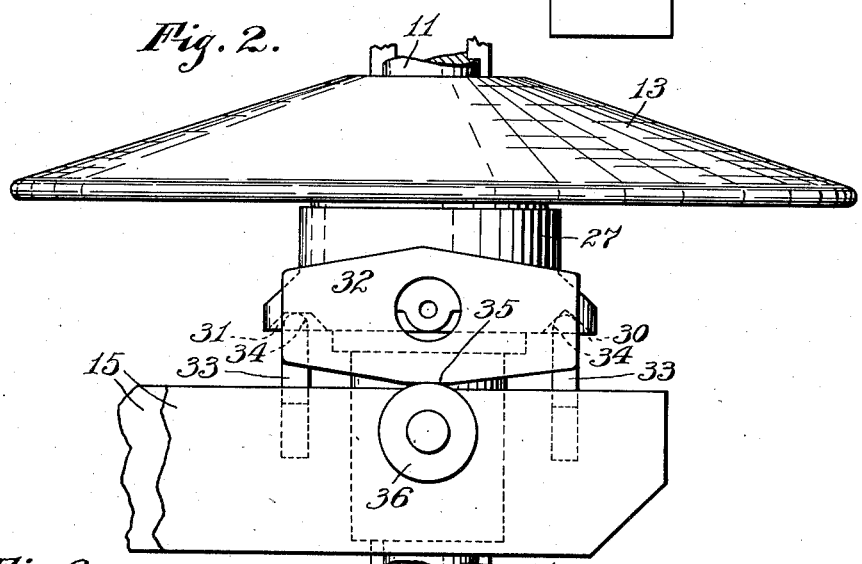
Figure 3:
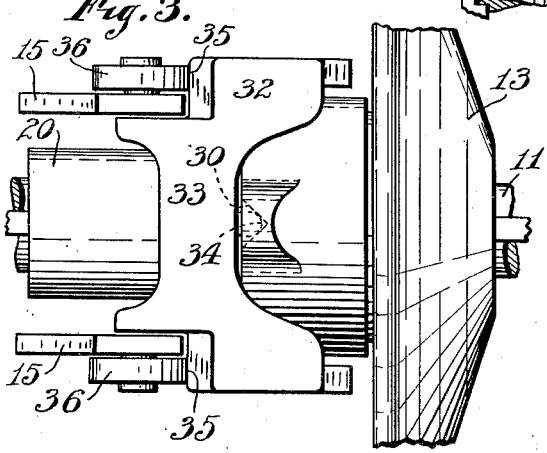

The accompanying drawings illustrate my invention. Fig. 1 is a plan of a "Reeves" transmission equipped with my improvement; Fig. 2 an enlarged fragmentary plan of one of the cones, thrust bearing, connecting yoke, and adjacent lever end; Fig. 3 an end elevation of the parts shown in Fig. 2; Fig. 4 a side elevation of the parts shown in Fig. 2, with the cone-shaft in section; Fig. 5 an axial section of the parts shown in Fig. 2, and Fig. 6 a plan of a modification.

In the drawings, 10 indicates a suitable supporting frame in which are journalled the driving shaft 11 and the driven shaft 12, said shafts being parallel and provided with axially-movable cone-pairs 13, 13 and 14, 14, respectively, said cone pairs being splined upon their respective shafts and oppositely shiftable toward and from each other by means of shifting levers 15, 15 fulcrumed at 16 and simultaneously shifted in opposite directions by means of a screw 17 and nuts 18, 18, engaging levers 15, 15. Thus far the construction is standard and well-known apparatus which has been on the market for many years.

In the present construction each cone is provided with a hub 20 shouldered at 21 to form an abutment for ring 22 of a standard ball thrust bearing. Ring 22 fits hub 20 with a snug fit permitting the ring to be slipped into place.

Ring 22 has a shallow ball-receiving groove 23 in which balls 24 run. Also cooperating with balls 24 is a second ring 25 having a shallow ball-receiving groove 26. Ring 25 has a bore somewhat larger than the diameter of hub 20 and externally fits snugly in a cup 27 having a bore somewhat larger than hub 20. Cup 27 is preferably extended over ring 22 and provided with dust guards 28 and 29 which lightly contact with hub 20 and ring 22 respectively.

On its back, cup 27 is provided, at diametrically opposite points with pockets or depressions 30 and 31, the pocket 30 preferably being conical while pocket 31 is preferably slightly oblated radially relative to cup 30.

Surrounding hub 20 is a ring or yoke 32 provided at diametrically opposite sides with fingers 33, 33 which extend axially of the cone.

At diametrically opposite points on yoke 32, and at the middle of fingers 33, and extending toward the cup 27, are two projections 34, 34, the ends of which are either conical or hemispherical so as to fit in pockets 30 and 31.

At diametrically opposite points on yoke 32, on the side away from the cone, and preferably ninety degrees from a line extending between the two projections 34, I provide pressure planes 35 which lie at right angles to the axis of the yoke and each receives a roller 36 journaled on the adjacent portion of lever 15.

By this arrangement the line of pressure of lever 15, (through rollers 36) upon the yoke 32 is at all times parallel with the axis of the yoke and the rollers practically eliminate any sidewise wiping effect of the lever on the yoke, thus minimizing the tendency to laterally shift ring 25 upon the balls 24 and practically eliminate any tendency to cause one ring to run eccentrically to the other. As a consequence, I have been able to make use of standard ball bearings of this type under this difficult service although previous attempts to make such use of similar bearings have been failures.

In Figure 6 I show a modification which, while not as efficient as the construction shown in the preceding figure, is an approximation which, in some instances, may be satisfactory.

In this construction I substitute, for the roller 36, a foot 40 pivoted at 41 upon lever 15 and engaging the adjacent pressure plane 35, the construction being such that the foot may slip laterally upon the pressure plane. In this construction there would be, at the moment of adjustment of the lever, a tendency to shift the outer ring or race of the bearing laterally relative to its companion ring but, the pressure plane being properly lubricated, the pressure will very quickly float to a position of rest where the pressure exerted by it upon the outer bearing ring will be parallel with the axis. It should be remembered in this connection that in apparatus of this kind there are many instances where adjustments of the cones relative to each other are comparatively infrequent and that a momentary tendency to laterally displace a bearing ring is practically negligible as compared with a tendency of that character which would be maintained throughout the entire period of operation of the apparatus in any particular position of adjustment.

I claim as my invention:

1. In a speed-varying transmission of the cone-pair type, the combination of the shiftable cone, the swinging shifting lever, a ball thrust bearing interposed between the cone and lever, a pair of diametrically opposite pressure-planes associated with said ball bearing and arranged substantially at right angles to the axis of the bearing, and rollers carried by the lever and engaging said pressure planes.

2. In a speed-varying transmission of the cone-pair type, the combination of the shiftable cone, the swinging shifting lever, a ball thrust bearing interposed between the cone and lever, a yoke having a swinging engagement at diametrically opposite points with the bearing and provided with a pair of diametrically opposite pressure planes arranged substantially at right angles to the axis of the bearing, and rollers carried by the lever and engaging said pressure planes.

3. In a speed-varying transmission of the cone-pair type, the combination of the shiftable cone, the swinging shifting lever, a ball thrust bearing interposed between the cone and lever, a pair of diametrically opposite pressure-planes associated with said ball bearing and arranged substantially at right angles to the axis of the bearing, and a thrust member between said lever and pressure planes having a pivotal connection with said lever.

4. In a speed-varying transmission of the cone-pair type, the combination of the shiftable cone, the swinging shifting lever, a ball thrust bearing interposed between the cone and lever, a yoke having a swinging engagement at diametrically opposite points with the bearing and provided with a pair of diametrically opposite pressure planes arranged substantially at right angles to the axis of the bearing, and a thrust member between said lever and pressure planes having a pivotal connection with said lever.

In witness whereof, I have hereunto set my hand at Indianapolis, Indiana, this 31st day of July, A. D. one thousand nine hundred and twenty-three.

MILTON O. REEVES.